Figure 1:
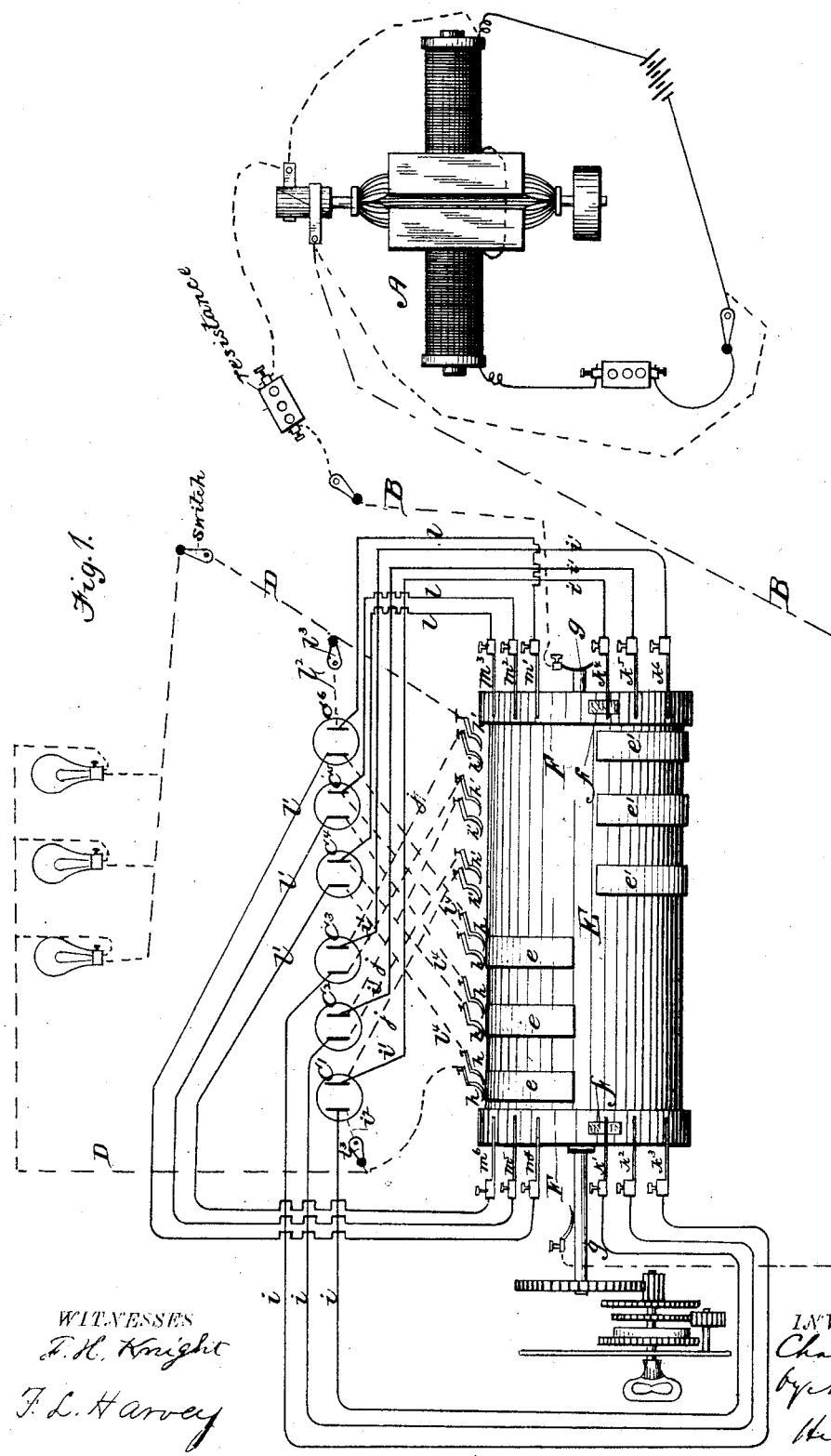

(No Model.) 2 Sheets—Sheet 1.

C. E. BUELL.
APPARATUS FOR CHARGING AND DISCHARGING SECONDARY BATTERIES.

No. 261,303. Patented July 18, 1882.

WITNESSES
F. H. Knight
F. L. Harvey

INVENTOR
Charles E. Buell
by Melville Church
his Attorney (No Model.) 2 Sheets—Sheet 2.

C. E. BUELL.
APPARATUS FOR CHARGING AND DISCHARGING SECONDARY BATTERIES
No. 261,303. Patented July 18, 1882.

WITNESSES
F. H. Knight
F. L. Harvey

INVENTOR
Charles E. Buell
by Melville Church
His Attorney

UNITED STATES PATENT OFFICE.

CHARLES E. BUELL, OF NEW HAVEN, CONNECTICUT.

APPARATUS FOR CHARGING AND DISCHARGING SECONDARY BATTERIES.

SPECIFICATION forming part of Letters Patent No. 261,303, dated July 18, 1882.

Application filed May 19, 1882. (No model.)

*To all whom it may concern:*

Be it known that I, CHARLES E. BUELL, of New Haven, in the county of New Haven and State of Connecticut, have invented certain new and useful Improved Apparatus for Charging and Discharging Secondary Batteries; and I do hereby declare the following to be a full, clear, and exact description of the same, reference being had to the accompanying drawings, forming a part of this specification.

The patent granted me March 21, 1882, No. 255,249, contemplates the employment of two series of secondary batteries in connection with a main charging-circuit including a dynamo-electric machine, a working-circuit, and switch devices for alternately connecting the pairs of one series of the secondary batteries successively into the charging-circuit to be charged, and simultaneously connecting the pairs of the other series into the working-circuit to be discharged in tension series; but the mechanisms and connections shown and described in said patent are such that the pairs of each series, when arranged for discharging, are not only coupled so as to discharge together in tension series, but also so as to discharge among themselves, thereby causing more or less diminution of discharge into the working-circuit. This discharge of the batteries among themselves results from the fact that the pairs of each series are adapted to be charged through sub-branches of a common main branch of the charging-circuit, besides having connections which adapt them to be coupled together for intensity. The switching mechanism, when operated to cause the discharge of the pairs of either series, cuts off the appropriate main branch of the charging-circuit from the charging-circuit proper and couples said pairs together in the working-circuit in tension series; but the connections to the sub-branches of the said main branch remaining unbroken, sub-circuits are formed which cause the pairs of plates to discharge among themselves.

In my present invention, which is an improvement upon the one before patented to me, each pair of plates is adapted to be charged directly through a separate main branch of the charging-circuit, instead of through a sub-branch of a main branch common to all the pairs of a series. The consequence is that when each series of pairs is discharging with the appropriate charging-branches disconnected from the charging-circuit proper the pairs do not discharge among themselves, but only into the working-circuit coupled for intensity.

My present improvement I will first describe at length, and then point them out particularly in the claims.

Figure 2:
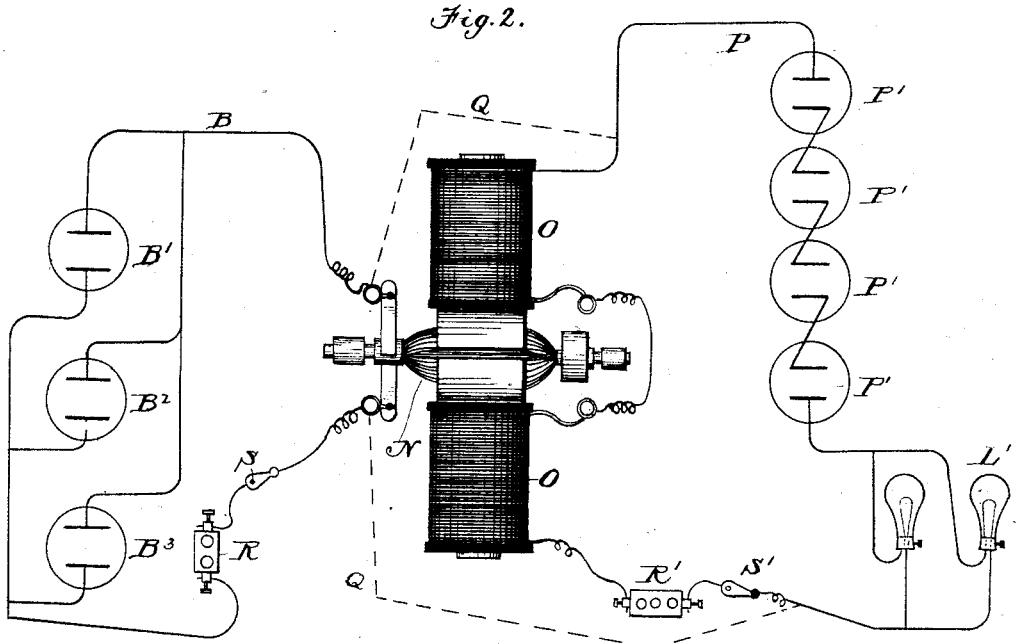
Figure 3:
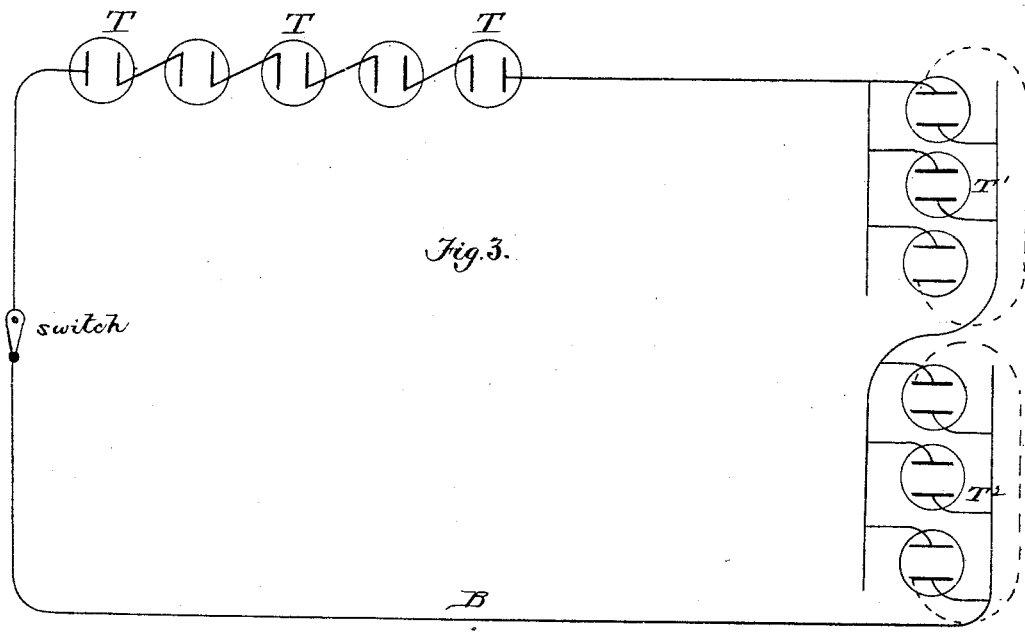

In the accompanying drawings, Figure 1 is a plan view of one embodiment of my invention; Fig. 2, a similar view, showing particularly the dynamo-electric generator and its connections; and Fig. 3 is a diagram showing the mode of charging a series of secondary batteries by means of secondary batteries.

Similar letters of reference in the several figures denote the same parts.

A represents a dynamo-electric machine or generator; B, a charging-circuit charged thereby; $C'$ $C^2$ $C^3$ and $C^4$ $C^5$ $C^6$, two series of secondary batteries adapted to be charged from the main charging-circuit, and D a working-circuit into which said secondary batteries are adapted to be discharged.

E is a switch-cylinder, of wood or other non-conducting material, mounted upon suitable bearings and adapted to be given a rotary movement by any suitable means. Upon the periphery of this switch-cylinder are arranged at one end a series of metallic projections or cam-surfaces, $e\ e\ e$, and at the other end another series of like metallic projections, $e'\ e'\ e'$, one series of such projections being arranged in advance of the other and all the projections of each series being in line with each other. The cylinder is provided at its ends with disks F F, formed with or secured to the cylinder so as to rotate therewith, but preferably, though not essentially, of greater diameter than the cylinder. Mounted upon the periphery of each of these disks is a metallic projection or cam-surface, $f$, which is in electrical connection with the short journal or bearing $g$ of the cylinder at that end.

$h\ h\ h\ h\ h\ h$ represent several pairs of spring-contacts, which are adapted when the cylinder is turned to be raised by and make connection through the series of metallic projections $e\ e\ e$, so as to discharge the secondary batteries $C^4$ $C^5$ $C^6$ into the working-circuit D in tension series; and $h'\ h'\ h'\ h'\ h'\ h'$ are another series of pairs of spring-contacts, which are lifted by and make connection through the metallic projections $e'\ e'\ e'$ when the cylinder is further turned, so as to place in a like manner the other series of secondary batteries, $C'\ C^2\ C^3$, in the working-circuit in tension series.

$i\ i\ i$ are lines of wire which connect one plate of each of the batteries $C'\ C^2\ C^3$ to a series of spring-contacts, $k'\ k^2\ k^3$, arranged over the left-hand disk F, and $i'\ i'\ i'$ other lines of wire which connect the other plate of each of said batteries to a corresponding series of spring-contacts, $k^4\ k^5\ k^6$, arranged over the right-hand disk F.

One plate of battery $C'$ is connected by a line, $i^2$, to the discharging or working circuit D, said line $i^2$ being adapted to be opened and closed by a switch, $i^3$. The other plate of said battery $C'$ and both the plates of the batteries $C^2\ C^3$ are connected by lines $j$ to the spring-contacts $h'\ h'\ h'\ h'\ h'$, and the last contact $h'$ to the right is connected to the discharging or working circuit D. This completes the description of the connections of batteries $C'\ C^2\ C^3$.

The connections of batteries $C^4\ C^5\ C^6$ are as follows: $l\ l\ l$ are lines of wire which connect one plate of each of said batteries $C^4\ C^5\ C^6$ to a series of spring-contacts, $m'\ m^2\ m^3$, arranged over the right-hand disk F, and $l'\ l'\ l'$ other lines of wire which connect the other plate of each of said batteries to a corresponding series of spring-contacts, $m^4\ m^5\ m^6$, arranged over the left-hand disk F.

One plate of battery $C^6$ is connected by a line, $l^2$, containing a switch, $l^3$, to the discharging or working circuit D, and the other plate of said battery $C^6$ and both the plates of each of the batteries $C^5\ C^4$ are connected by lines $l^4$ to the spring-contacts $h\ h\ h\ h\ h$, while the last contact $h$ to the left is connected to the discharging or working circuit D.

The charging-circuit B includes the bearings $g\ g$ and the metallic projections or cam-surfaces $f\ f$, as shown.

When the cylinder and its disks are turned the metallic projections $f\ f$ on the disks make connection with the pairs of spring contacts $k'\ k^4$, $k^2\ k^5$, $k^3\ k^6$, successively, thereby placing the secondary batteries $C'\ C^2\ C^3$, one after the other in succession, in the main charging-circuit to be charged. When this charging of the batteries $C'\ C^2\ C^3$ begins to take place the spring-contacts $h\ h$, $h\ h$, $h\ h$ make connection with metallic projections $e\ e\ e$, thereby coupling the secondary batteries $C^4\ C^5\ C^6$ in tension series and causing them to discharge into the working or discharging circuit D.

Upon a further rotation of the cylinder the projections $f\ f$ will make connection with the pairs of spring-contacts $m'\ m^4$, $m^2\ m^5$, $m^3\ m^6$, successively, so as to charge in succession the series of secondary batteries $C^4\ C^5\ C^6$, while metallic projections $e'\ e'\ e'$ will make connection with spring-contacts $h'\ h'$, $h'\ h'$, $h'\ h'$, so as to in turn discharge the series of batteries $C'\ C^2\ C^3$.

It will be observed that the corresponding projections on the disks are so arranged with respect to the projections on the cylinder that while the projections on the disks are making successive connection with their several pairs of contacts to charge one series of batteries one set of projections on the cylinder are making connection with their spring-contacts to discharge the other series of batteries. By this arrangement it will be seen that one series of secondary batteries are being charged in succession from the charging-circuit while the other series are being discharged in tension series into the working-circuit.

For the purpose of keeping the charging-circuit normally closed during the charging of each set of batteries, the spring-contacts of each series which co-operate with the projections $f$ of the disks are so arranged with respect to said projections that before one set of contacts leave said projections the succeeding set of contacts engage with them, and thus one set at least of the contacts is kept in connection with the projections until the whole series of batteries are charged.

The switches $i^3\ l^3$ may be employed to prevent the discharge of either series of batteries, when desired.

I do not wish to confine myself to the particular mechanism shown for effecting the successive charging of the plates of one series of secondary batteries and the simultaneous discharging of all the plates of another series of secondary batteries in a common working-circuit in tension series, as I regard my invention as covering broadly the improved mode of effecting this result without restriction as to details of mechanism.

The number of series of secondary batteries employed can be multiplied indefinitely, and as many as desired can be charged and discharged at a time in the mode indicated.

Ordinarily where a dynamo-electric machine is employed to charge a circuit including secondary batteries the helices of the field-of-force magnets are included in the charging-circuit, and there is a constantly-recurring backflow of current of short duration from the secondary batteries, which affects the polarity of the field-of-force magnets and detracts from the effective action of the generator. To overcome the disadvantages arising from this backflow of current, I interpose only the armature-helix of the dynamo-electric machine in the charging-circuit including the secondary batteries, and interpose the helices of the field-of-force magnets in an electric circuit extraneous to the charging-circuit. This extraneous circuit may be a galvanic-battery circuit, a circuit derived from the dynamo-machine itself, or an independent circuit charged from the secondary batteries.

In Fig. 2, B represents the charging-circuit, including secondary batteries B' B² B³, an adjustable resistance, R, switching devices S, and the armature-helix N of a dynamo-electric machine. O O are the helices of the field-of-force magnets included in a circuit, P, containing a series of secondary batteries, P' P' P' P', a resistance, R', a switch, S', and electric lamps L'. The secondary batteries P' P' P' P' are charged from the main charging-circuit by devices such as shown in Fig. 1, while the batteries B' B' B' are adapted to discharge into a separate independent working-circuit, as also shown in Fig. 1. With an arrangement of this description any backflow upon the main charging-circuit B from the secondary batteries B' B' B' will not affect the polarity of the magnets in the field-of-force helices, and the effective energy of the machine will not be injuriously disturbed.

Instead of employing the secondary batteries in the circuit P, connection may be made between the commutator and the helices of the field-of-force magnets, as shown by the dotted lines Q Q, Fig. 2, the circuit thus formed being independent of the charging-circuit.

The variable resistances R and R' are useful to control the tension of the circuits in which they are located, while the switches S and S' are for the purpose of opening and closing their circuits.

The charging-circuit including the secondary batteries may be itself charged by means of one or more larger secondary batteries, which are themselves charged from any proper source of electrical power. Such an arrangement is shown in Fig. 3, B representing the charging-circuit, T the secondary batteries for charging the same, and T' and T² the secondary batteries to be charged from the charging-circuit, and themselves discharging into separate working-circuits, as represented by the dotted lines.

Where the helices of the field-of-force magnets are included in the derived circuit Q any backflow of current from the secondaries does not tend to depolarize the field-of-force magnets, but, on the contrary, tends to strengthen them.

I claim as my invention—

1. The combination, substantially as described, of a charging-circuit including a dynamo-electric machine or battery, two series of secondary batteries, each of which series is composed of two or more pairs of plates or electrodes which are separately connected to independent branches of the charging-circuit, and switching devices for alternately connecting the independent charging-branches of one series successively to the charging-circuit, so as to successively charge the pairs of that series, and at the same time disconnecting the charging-branches of the pairs of the other series from the charging-circuit and interposing said other series into the working-circuit coupled for intensity.

2. The combination, substantially as described, with an electrical generating-machine, of a charging-circuit which includes the helices of the field-of-force magnets, a separate exterior charging-circuit which includes the helix of the armature, a working-circuit, two series of secondary batteries, each of which series is composed of two or more pairs of plates or electrodes, independent branches of the charging-circuit, and switching devices for alternately connecting the independent charging-branches of one series successively with the charging-circuit and disconnecting the charging-branches of the pairs of the other series from the charging-circuit and interposing said other series in the working-circuit coupled for intensity.

3. The combination, with an electrical generating-machine, of a charging-circuit which includes the helix of the armature, a working-circuit, two series of secondary batteries, each of which series is composed of two or more pairs of plates or electrodes, independent branches of the charging-circuit, and switching devices for alternately connecting the independent charging-branches of one series successively with the charging-circuit and disconnecting the charging-branches of the pairs of the other series from the charging-circuit and interposing said other series into the working-circuit coupled for intensity, whereby the reversal of the magnetic condition of the machine by backflow from the batteries is avoided and the loss of charge from backflow from the batteries, if the generator slackens speed or stops, is confined to one pair of plates or electrodes.

4. The combination, with an electrical generating-machine, of a charging-circuit which includes the helices of the field-of-force magnets, a separate exterior charging-circuit which includes the helix of the armature, a working-circuit, two series of secondary batteries, each of which is composed of two or more pairs of plates or electrodes, independent branches of the charging-circuit, switching devices for alternately connecting the independent charging-branches of one series successively with the charging-circuit and disconnecting the charging-branches of the other series from the charging-circuit and interposing said other series in the working-circuit coupled for intensity, and independent means for separately regulating the circuits which include the armature-helix and the field-of-force magnets, substantially as described.

CHARLES E. BUELL.

Witnesses:
M. CHURCH,
D. L. SHOEMAKER.